Patented May 22, 1923.

1,456,112

UNITED STATES PATENT OFFICE.

EDWARD G. ACHESON, OF NEW YORK, N. Y.

REFLOCCULATED PRODUCT AND PROCESS OF PREPARING SAME.

No Drawing.  Application filed November 25, 1921. Serial No. 517,824.

*To all whom it may concern:*

Be it known that I, EDWARD G. ACHESON, a citizen of the United States, residing at New York city, in the county of New York and State of New York, have invented certain new and useful Improvements in Reflocculated Products and Processes of Preparing Same, of which the following is a specification.

This invention comprises a novel process applicable to the treatment of a wide variety of solid bodies, usually amorphous, which are capable of undergoing the physical change which I have designated, in my previous patents and scientific publications, as "deflocculation." The invention comprises also the product of this process.

For purposes of clearness, and particularly because this term has been loosely used in some cases, I will here define "deflocculation" as comprising a further subdivision of matter brought about by the action thereon of certain organic bodies or agents known in this art as "deflocculating agents." When such deflocculating agents are incorporated with the body to be deflocculated, the latter being in presence of a sufficiently restricted proportion of water or other suitable liquid, and the resulting heavy paste is subjected to prolonged mechanical working, the component particles, or a portion of them, undergo deflocculation with the result that they are subdivided into extremely minute masses, which in some cases at least are now believed to be of molecular dimensions. Such deflocculated particles are beyond the limits of visibility under ordinary microscopic conditions, but appear under the ultra microscope as brilliant points, without discernible form, but in intense vibratory movement.

Processes of deflocculation and deflocculating agents for use in connection therewith have been disclosed in many of my prior U. S. patents, among which I may refer by way of example to U. S. 1,223,350, of Apr. 24, 1917, as disclosing a preferred mechanical method of effecting the deflocculation; U. S. 1,253,556 of Jan. 15, 1918, and 1,345,305 of June 29, 1920, as disclosing preferred deflocculating agents; and U. S. 1,345,306 of June 29, 1920, as disclosing the preferred moisture relations in the deflocculating processes. In treating materials according to the present invention the first step consists in subjecting the solid body, preliminarily freed if necessary from coarse particles, grit, etc., by any suitable classifying device, to deflocculation. In a typical instance, more fully disclosed in the several patents above referred to, this is accomplished by preparing a deflocculating agent by roasting a starchy material, for example a cereal grain, and extracting the soluble components with aqueous ammonia, or preferably with an ammoniacal solution of hexamethylenetetramine; by incorporating the resulting solution with the finely powdered solid substance to be deflocculated, preferably in such limited proportion that the total moisture content is below that required to saturate the paste or to fill the interstices between the particles; and then subjecting this paste to a prolonged and intensive attrition, for example by means of the mechanical appliances and under the conditions set forth in my prior Patent 1,223,350 mentioned above. This attrition is necessary in order to secure any substantial degree of deflocculation, since without it the deflocculated particles, should such be formed, cannot be detached and isolated from each other and from the relatively large masses which constitute what I may designate as the "mother particles." As has been fully explained in my prior patents, the organic deflocculating agent is progressively taken up or adsorbed by the deflocculated particles, by which it is strongly retained.

The deflocculation of matter, as defined and illustrated above, should in particular be clearly distinguished from mere classifying operations, according to which pre-existing fine particles are separated, usually in aqueous suspension, from pre-existing coarser particles. An example of such classifying process is the well known treatment of clay in water-suspension, according to which the clay suspension, either with or without the addition of suspending agents such as sodium carbonate, alkalis, certain colloidal bodies, etc., is permitted to remain either at rest or in slow movement until a more or less complete subsidence of the coarser particles take place, the fine particles being thereafter recovered in any suitable manner, as for example by more prolonged subsidence, with or without the addition of electrolytes, neutralizing agents, acids or the like to promote the settling. In all such processes (to which the term "deflocculation" has at times been incorrectly or loosely applied) there is no further subdivision of the particles existing in the original material, and the recovered product consists either of these original particles, more or less completely classified according to the particular conditions of operation, or of larger aggregates formed by the union of these original particles. In my deflocculation process, on the contrary, as already explained, there takes place a subdivision of the matter of the original charge with the resulting formation of minute particles, which may be brought into aqueous suspension by stirring with water, and when once so suspended display the permanence and the properties of so-called colloidal solutions.

In my prior patent, U. S. 843,426 of Feb. 5, 1907, I have disclosed a method comprising deflocculating such solid substances as graphite, lampblack, precipitated alumina, clay, etc. etc.; floating the deflocculated particles away from the residual non-deflocculated material; and then recovering the deflocculated particles by precipitation with such electrolytes as muriatic acid HCl or alum. The resulting precipitate consists wholly or substantially of re-flocculated particles or aggregates and is useful for many purposes in the arts; it is however subject to certain serious drawbacks especially when used for the manufacture of molded and fired articles such as crucibles or the like, such articles being subject to heavy shrinkage of volume with consequent liability to cracking. The material is also expensive owing to the relatively small proportion of deflocculated product attainable in a single operation from the original mass.

The present invention may be regarded in one of its aspects as an improvement upon the above process, having for its purpose to produce a product of wider application in the arts, and relatively free from the above mentioned defects. After deflocculating the charge as described above, I subject the entire product, comprising deflocculated and non-deflocculated particles and commonly known as the "mill paste" to a carefully controlled mechanical classification, preferably by means of a Dorr thickener or similar device. Thereby the coarser non-deflocculated particles are segregated on the one hand, and may if desired be returned to the deflocculating mill, with fresh material, for re-treatment. The fine effluent comprises the whole of the deflocculated particles, together with a proportion of fine, suspensible but non-deflocculated particles, which proportion may be accurately controlled for the particular purpose in view, by increasing or decreasing the rate of flow of the suspending medium, or in other types of classifying device by controlling the rate of flow of the suspending medium or by such other adjustments as may be provided in the particular apparatus used. The object in every case, it will be understood, is to provide a suspended mixture of non-uniform particles, comprising both deflocculated and non-deflocculated particles.

This mixture may thereafter be treated by the addition of a minute proportion of a suitable electrolyte, as alum, hydrochloric acid or the like, whereby re-flocculation and subsidence are brought about. The non-deflocculated particles subside, while the deflocculated particles unite with each other into fragile aggregates which likewise subside. The whole of this precipitated matter is then collected, after running off the supernatant water and may be subjected to a thorough mechanical working or mixing to render it homogeneous. It is then ready for use in accordance with the desired purpose, the moisture content being of course properly adjusted by pressing, drying or the like, according as the material is to be employed in paste or powder form, incorporated with other materials, etc. Among the uses to which the product may be applied may be mentioned its incorporation as a filler in paper pulp, soap and other commercial products; its use as a paint when the original material possesses pigment value; the manufacture of crucibles and other ceramic products; etc.

Among the many materials to which the process is advantageously applied I may mention the following by way of example: carbon and graphite in their various forms; feldspar; clay; flowers of sulfur; zirconia; and such pigments as red lead, lithopone, senna, ochre and ultramarine blue.

I claim:

1. The herein described novel product prepared by subjecting a solid material susceptible of deflocculation to attrition in presence of an organic deflocculating agent and thereafter re-flocculating the colloidal material in presence of the residual fine material, said product comprising an intimate mixture of non-deflocculated and re-flocculated particles.

2. In a process of treating solid materials susceptible of deflocculation, the steps comprising subjecting the material to attrition in presence of an organic deflocculating agent whereby a portion of the same is transformed into the deflocculated or colloidal state; and thereafter reflocculating the colloidal material in presence of the residual fine material.

3. Process of treating solid materials susceptible of deflocculation, comprising subjecting the same to attrition in presence of an organic deflocculating agent; classifying the resulting product into a coarser non-deflocculated portion, and a portion comprising the deflocculated matter and finer non-deflocculated material; and thereafter reflocculating the deflocculated matter in presence of said finer non-deflocculated material.

In testimony whereof, I affix my signature.

EDWARD G. ACHESON.